Feb. 10, 1925.

L. A. FOWLER 1,525,577

BRAKE VALVE DEVICE

Filed May 3, 1924

INVENTOR
LESTER A. FOWLER
BY Wm. M. Cady
ATTORNEY

Patented Feb. 10, 1925.

1,525,577

UNITED STATES PATENT OFFICE.

LESTER A. FOWLER, OF OAKLAND, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed May 3, 1924. Serial No. 710,793.

*To all whom it may concern:*

Be it known that I, LESTER A. FOWLER, a citizen of the United States, residing at Oakland, in the county of Alameda and State of California, have invented new and useful Improvements in Brake-Valve Devices, of which the following is a specification.

This invention relates to fluid pressure brakes, and more particularly to a brake valve device.

The principal object of my invention is to provide an improved brake valve device for graduating the brakes on and off.

Figure 1:
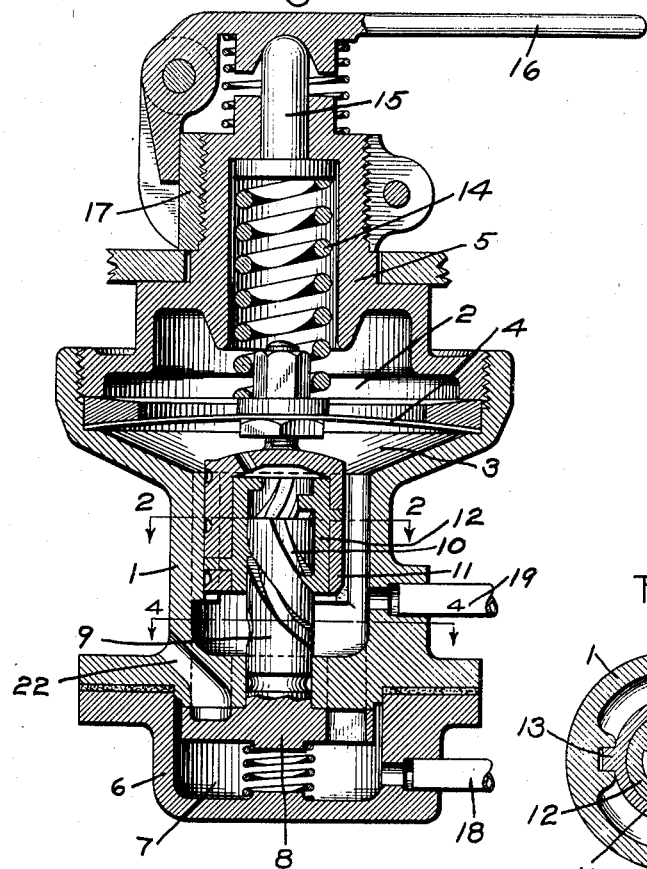
Figure 2:
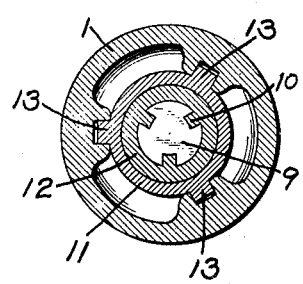
Figure 4:
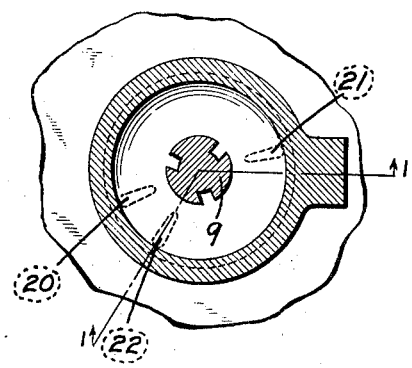
Figure 3:
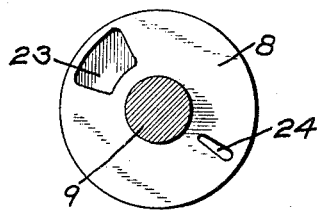

In the accompanying drawing; Fig. 1 is a vertical section of a brake valve device embodying my invention, the rotary valve seat being sectioned on line 1—1 of Fig. 4; Fig. 2 a section on the line 2—2 of Fig. 1; Fig. 3 a face view of the rotary valve; and Fig. 4 a section on the line 4—4 of Fig. 1.

As shown in the drawing, the brake valve device may comprise a casing 1, having a chamber which is divided into diaphragm chambers 2 and 3 by a flexible diaphragm 4, the diaphragm being clamped in place by a cover casing 5. Applied to the under side of casing 1 is a valve casing 6 having a valve chamber 7 containing a rotary valve 8. Said valve is provided with an operating stem 9 extending upwardly into casing 1 and having cut thereon one or more coarse pitched screw threads 10. The screw threads work in a nut which may comprise a sleeve member 11 having therein a Babbitt metal nut portion 12, which is cast in the sleeve member and so as to fill the screw threads 10.

The sleeve member 11 is provided with vertical guide ribs 13 adapted to slide in corresponding grooves cut in the surrounding casing 1, and said member is secured to the flexible diaphragm 4.

A coil spring 14 acting on diaphragm 4 is mounted in chamber 2 and is engaged by a spring follower 15, and an operating handle 16, pivotally mounted on a sleeve 17, secured to casing 5, is adapted to engage the follower 15.

The valve chamber 7 is connected by pipe 18 to a source of fluid under pressure and diaphragm chamber 3 is connected by pipe 19 to a brake chamber, the admission of pressure to which is adapted to apply the brakes. The valve seat of rotary valve 8 is provided with ports 20 and 21 leading to chamber 3 and a port 22 leading to the atmosphere.

In operation, when there is no pressure on spring 14, the rotary valve 8 will be positioned to connect ports 20 and 22 through a cavity 23, so that chamber 3 and the brake chamber will be connected to the atmosphere.

When the handle 16 is depressed, the spring 14 is compressed and exerts pressure on diaphragm 4, so that said diaphragm moves the sleeve member 11 downwardly to cause the rotation of the stem 9 and the rotary valve 8 to a position in which a through port 24 in the rotary valve registers with port 21. Fluid under pressure is then admitted from valve chamber 7 to chamber 3 and thence through pipe 19 to the brake chamber to effect an application of the brakes.

When the pressure in chamber 3, and acting on diaphragm 4, has been increased to a degree slightly exceeding the pressure of spring 14, the diaphragm will be moved upwardly so as to rotate the valve 8 to a position in which the further supply of fluid to the brake chamber is cut off.

The pressure in the brake chamber may obviously be increased by further depressing the handle 16. The brakes may be released by relieving the pressure on said handle, so that the higher pressure in chamber 3 will move the diaphragm 4 upwardly and cause rotation of the valve 8 to release position.

Having now described my invention, what I claim as new and desire to secure by Letters Patent, is:—

1. In a brake valve device, the combination with a rotatable valve for controlling the brakes and a valve stem for operating said valve having screw threads, of a non-rotatable nut engaging said screw threads, a flexible diaphragm for reciprocating said nut, and means for applying pressure to said diaphragm.

2. In a brake valve device, the combination with a rotatable valve for controlling the brakes and a valve stem for operating said valve, of a nut having screw-threaded engagement with said stem, means for preventing rotation of said nut, a movable abutment for imparting longitudinal movement to said nut for effecting the rotation of said stem and valve, and means for applying pressure to said abutment.

3. In a brake valve device, the combination with a rotatable valve for controlling the brakes, of a flexible diaphragm, a screw and nut connection between said valve and said diaphragm for effecting rotation of said valve upon axial movement of said diaphragm, and means for applying pressure to said diaphragm for operating same.

In testimony whereof I have hereunto set my hand.

LESTER A. FOWLER.